United States Patent
Yao et al.

(10) Patent No.: US 11,548,372 B2
(45) Date of Patent: Jan. 10, 2023

(54) METHOD AND SYSTEM FOR VEHICLE COOLING SYSTEMS

(71) Applicant: Ford Global Technologies, LLC, Dearborn, MI (US)

(72) Inventors: Yixin Yao, Ann Arbor, MI (US); Hassan Farhat, Dearborn, MI (US); Rajit Johri, San Francisco, CA (US); Ravi Gopal, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 17/181,813

(22) Filed: Feb. 22, 2021

(65) Prior Publication Data
US 2022/0266680 A1 Aug. 25, 2022

(51) Int. Cl.
| | | |
|---|---|---|
| B60K 11/06 | (2006.01) | |
| H02P 21/13 | (2006.01) | |
| F01P 7/16 | (2006.01) | |
| F01P 7/04 | (2006.01) | |

(52) U.S. Cl.
CPC ............. B60K 11/06 (2013.01); F01P 7/048 (2013.01); F01P 7/164 (2013.01); H02P 21/13 (2013.01); *F01P 2025/62* (2013.01)

(58) Field of Classification Search
CPC .............. F01P 7/164; F01P 7/08; B60K 11/06
See application file for complete search history.

(56) References Cited

U.S. PATENT DOCUMENTS

| | | | |
|---|---|---|---|
| 9,410,473 B2 | 8/2016 | Cregut et al. | |
| 10,444,624 B1* | 10/2019 | Lu | G03F 7/0002 |
| 10,780,877 B2 | 9/2020 | Fujita | |
| 2002/0016656 A1* | 2/2002 | Chung | F01P 7/048 |
| | | | 701/36 |
| 2020/0341062 A1* | 10/2020 | Wang | G06F 30/23 |

FOREIGN PATENT DOCUMENTS

JP 2001265408 A * 9/2001 ........... B29C 47/889

OTHER PUBLICATIONS

Soloway, D. et al., "Neural Generalized Redictive Control," Proceedings of the 1996 IEEE International Symposium on Intelligent Control, Sep. 15, 1996, Dearborn, Michigan, 6 pages.

* cited by examiner

*Primary Examiner* — Kevin A Lathers
(74) *Attorney, Agent, or Firm* — Vincent Mastrogiacomo; McCoy Russell LLP (57) ABSTRACT

Methods and system for operating a vehicle cooling system are described. In one example, the vehicle cooling system cools a heat generating device via a fan and pump. A speed of the fan is commanded by a feedback controller with possible neural network predictive control to track a variable temperature reference that is based on thermal load estimation. A disturbance observer may be applied to observe thermal load and an observer-based observer may be used to generate the temperature reference so that the power consumption of a fan is minimized.

15 Claims, 10 Drawing Sheets

METHOD AND SYSTEM FOR VEHICLE COOLING SYSTEMS

FIELD

The present description relates to methods and a system for controlling a temperature of a device while reducing power consumption when cooling the device. The methods and system may be particularly useful for vehicles that are solely electrically propelled vehicles, hybrid vehicles, or fuel cell vehicles.

BACKGROUND AND SUMMARY

A vehicle may include one or more devices that generate heat during operation. Often, thermal energy is transferred from the one or more devices to ambient air so that the one or more devices may continue to operate as expected. The fan and/or pump may be part of a cooling system that controls temperatures of the one or more devices via adjusting a speed of a fan and/or adjusting a speed of a pump. An amount of power that is consumed by the fan may be substantially greater than an amount of power that is consumed by the pump. Optimal control methods may be applied to control the fan and the pump, but it may be difficult to model nonlinear uncertainties of the cooling system. In particular, model-based optimal controllers rely on a controlled plant dynamic model. However, the thermal controlled plant dynamic model is severely nonlinear with uncertainties and disturbances. As such, it is very difficult to create the accuracy control plant model in the real world. Therefore, it may be desirable to provide a way of controlling a cooling system that provides a desired level of performance and is simpler to understand and implement.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
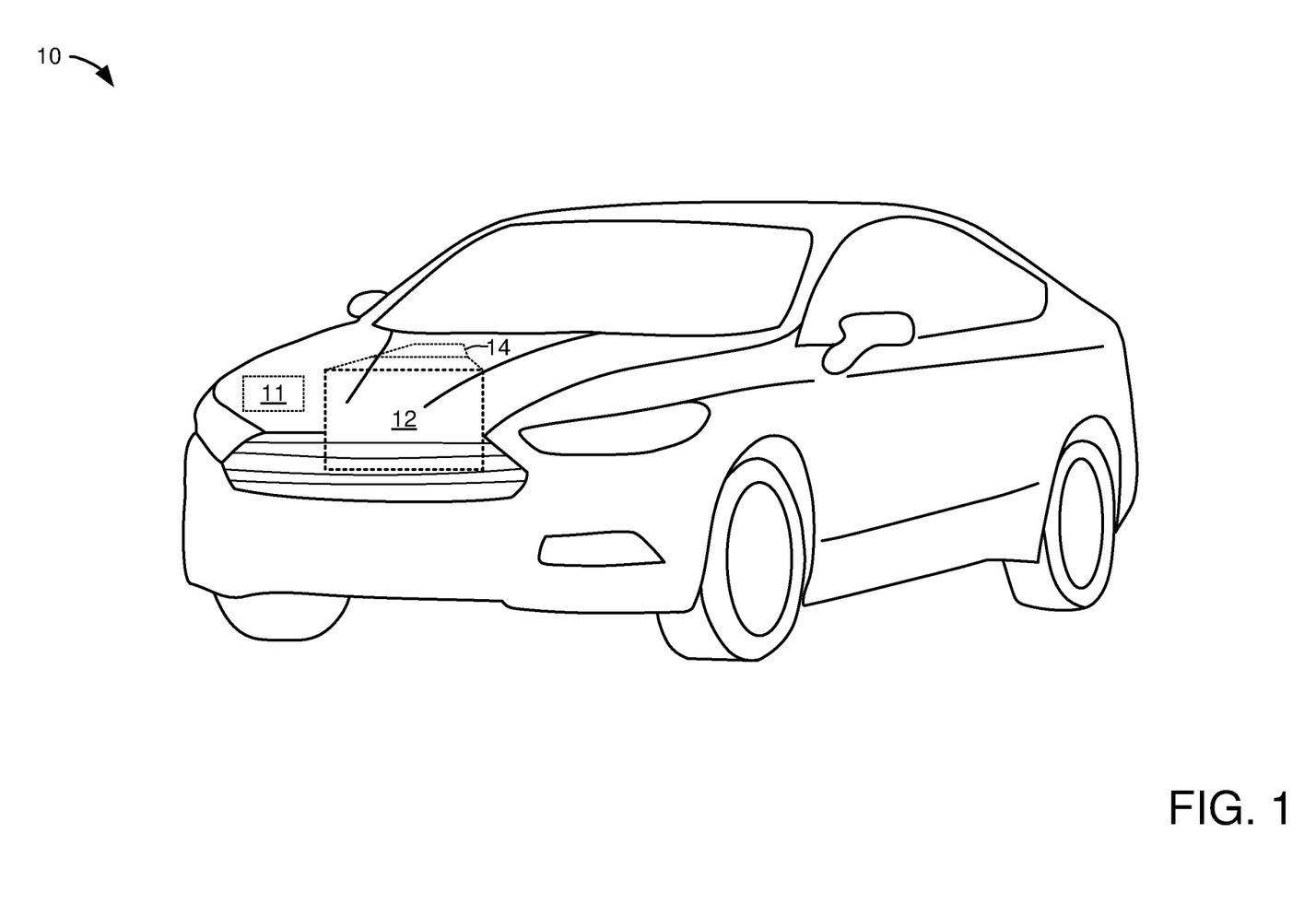
FIG. 1 is a schematic diagram of a vehicle.
Figure 2:
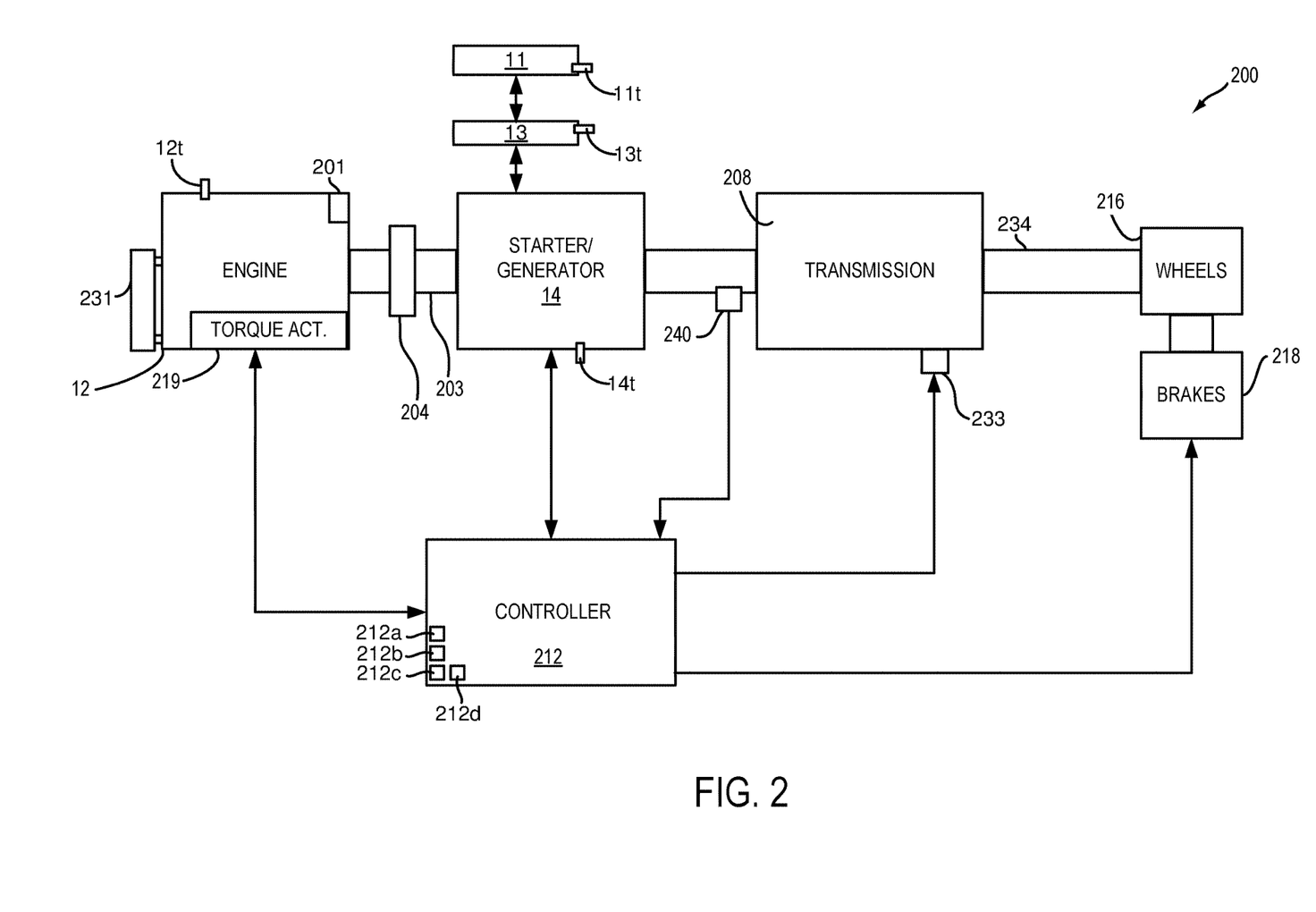
FIG. 2 shows an example vehicle driveline for the vehicle of FIG. 1.
Figure 3:
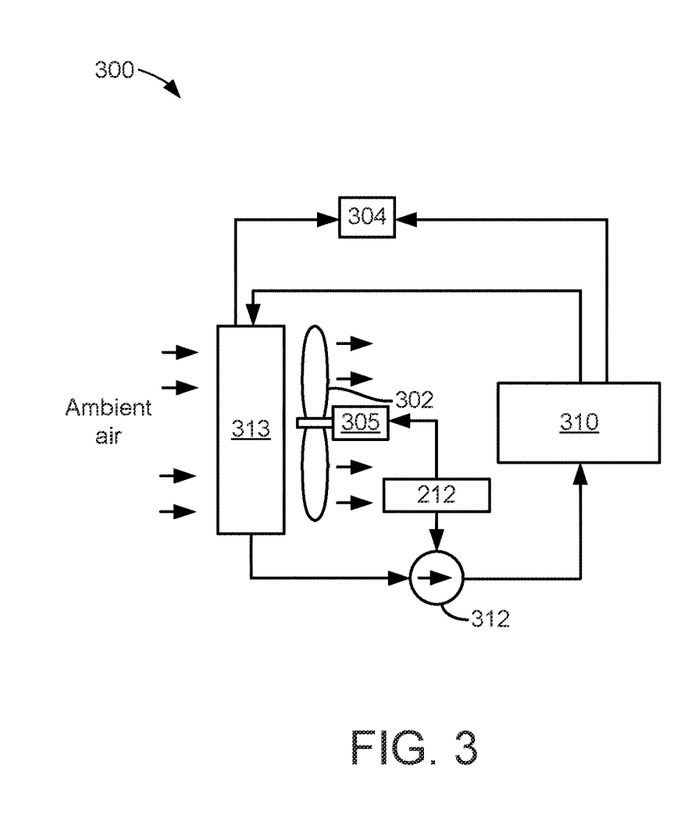
FIG. 3 shows a block diagram of an example cooling system for a device.
Figure 4:
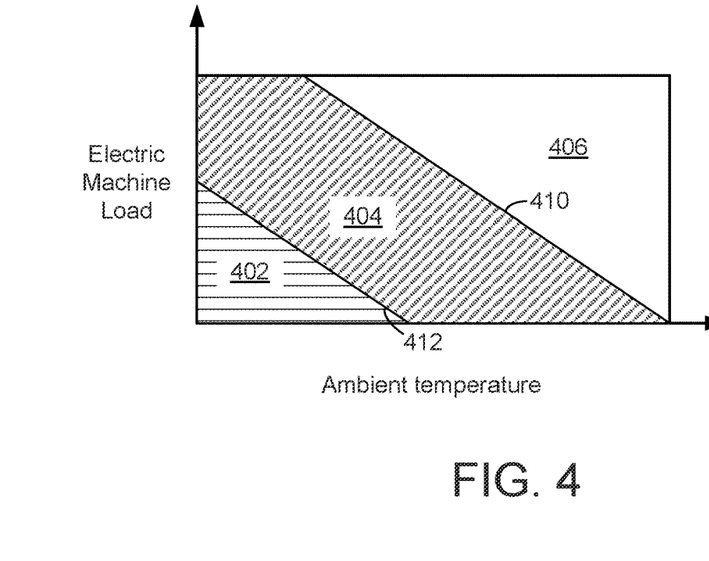
FIG. 4 shows a plot that illustrates fan motor speed commands as a function of ambient temperature and thermal load of an electric machine.
Figure 5:
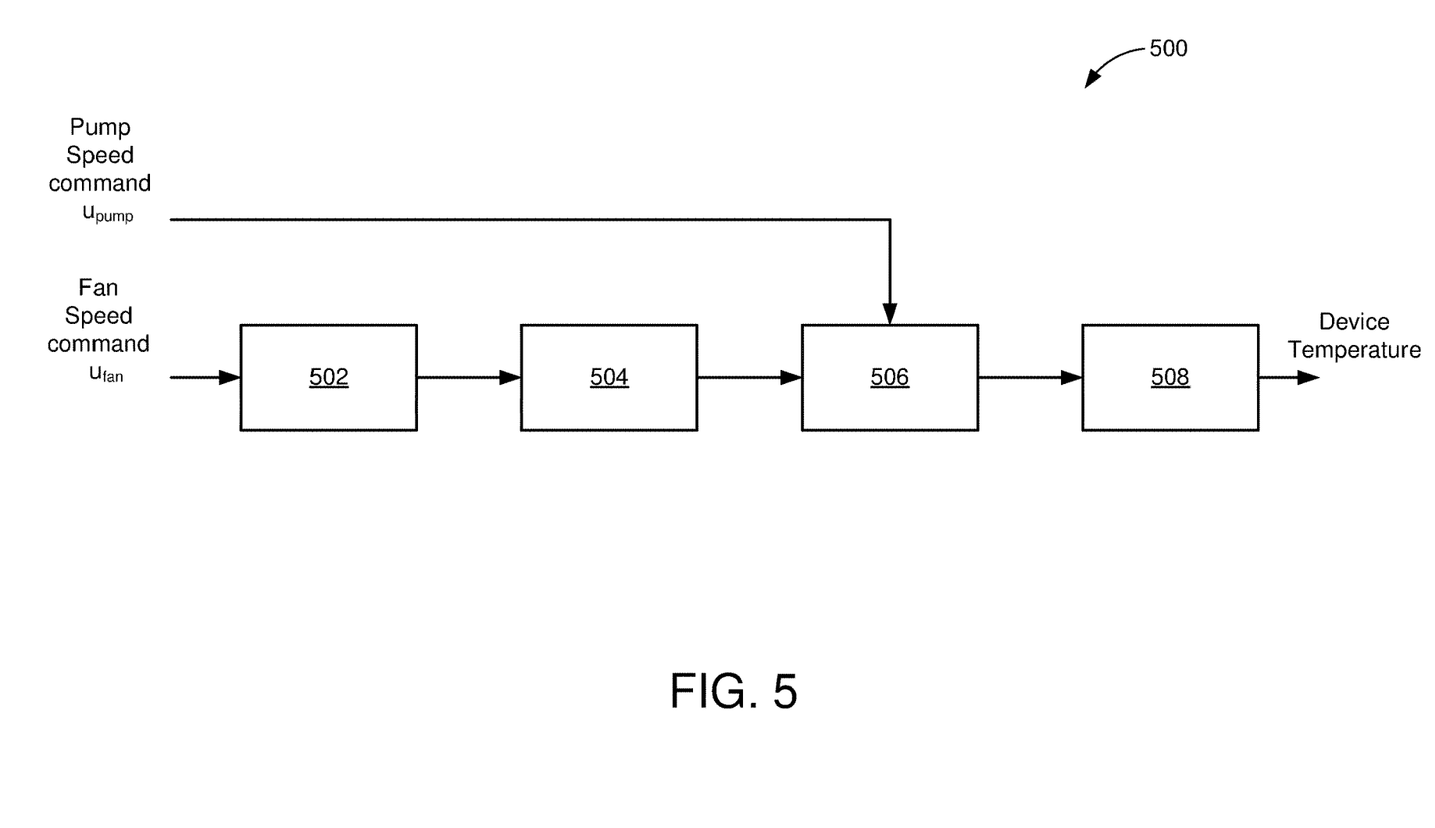
FIG. 5 shows a simplified block diagram of a controlled plant.
Figure 6:
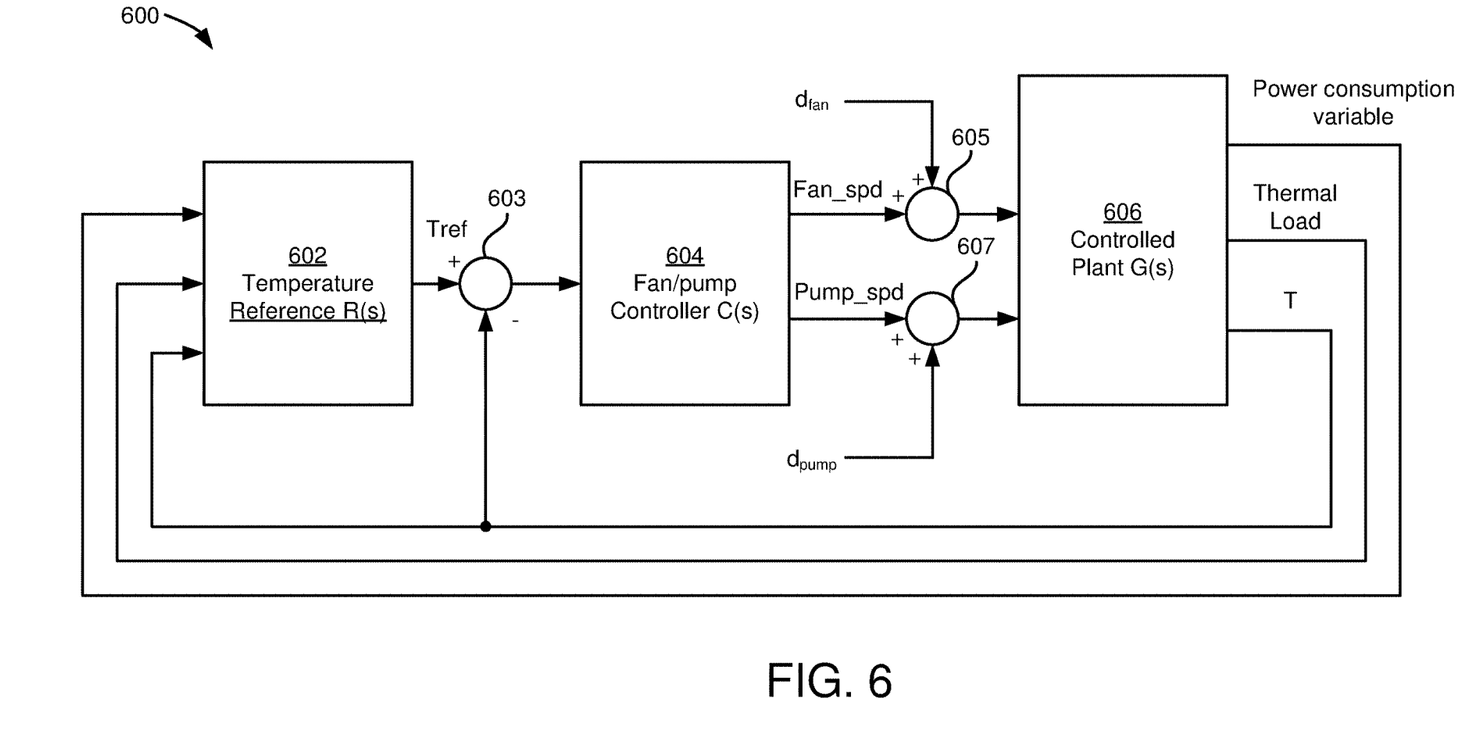
FIG. 6 shows a generalized block diagram of a temperature and energy control system for a cooling system of a device.
Figure 7A:
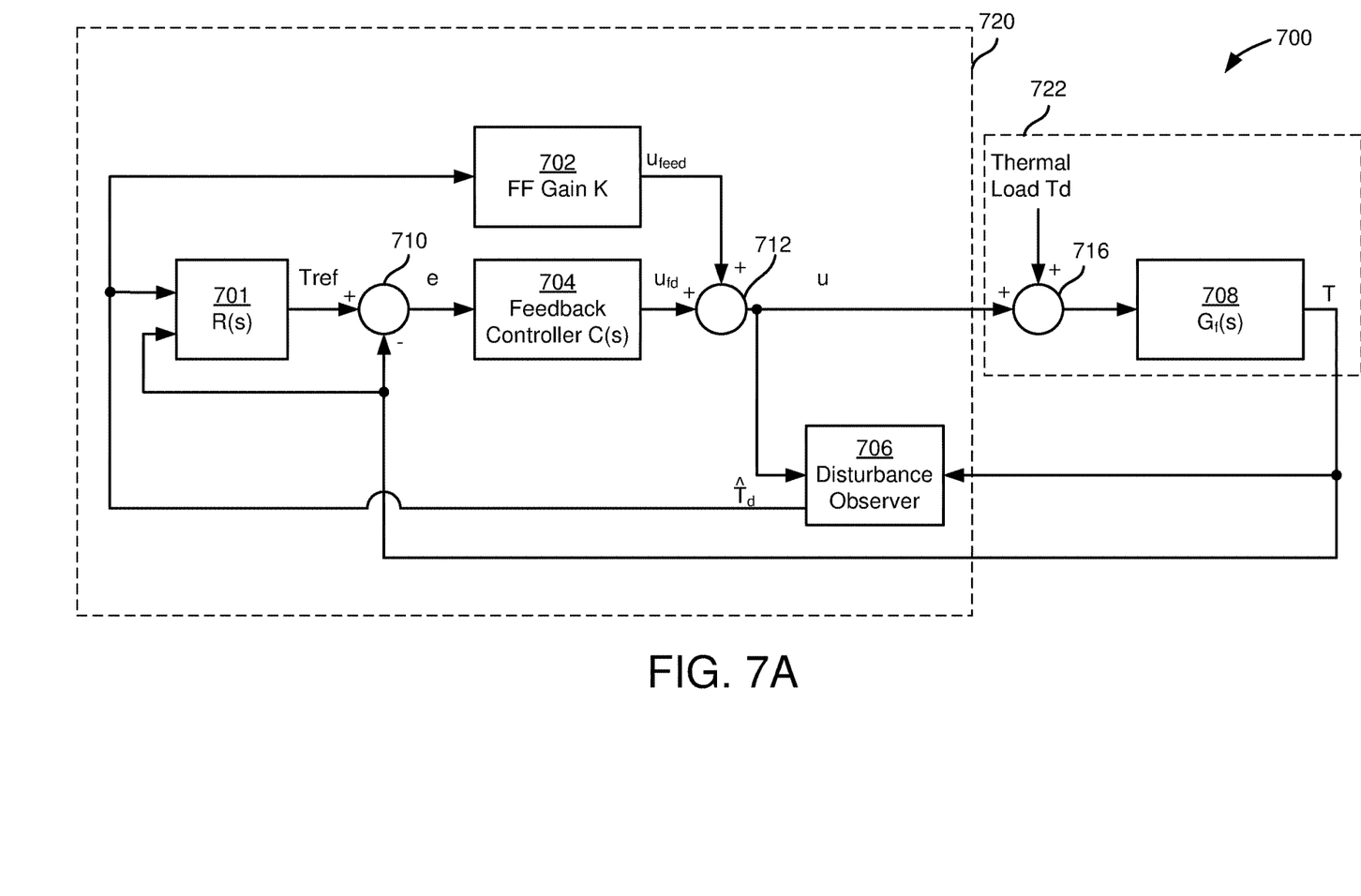
FIG. 7A shows a detailed block diagram of the temperature and energy control system shown in FIG. 6.
Figure 7B:
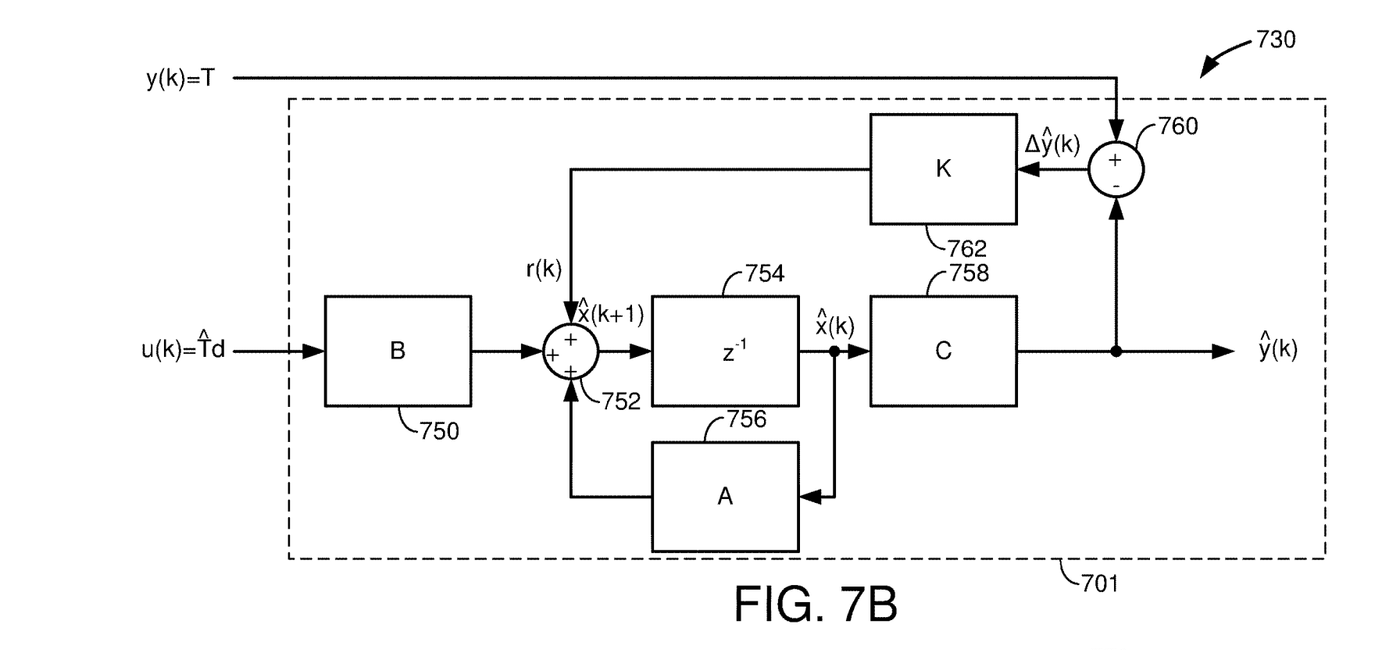
FIG. 7B shows a detailed first example of a temperature reference generator.
Figure 7C:
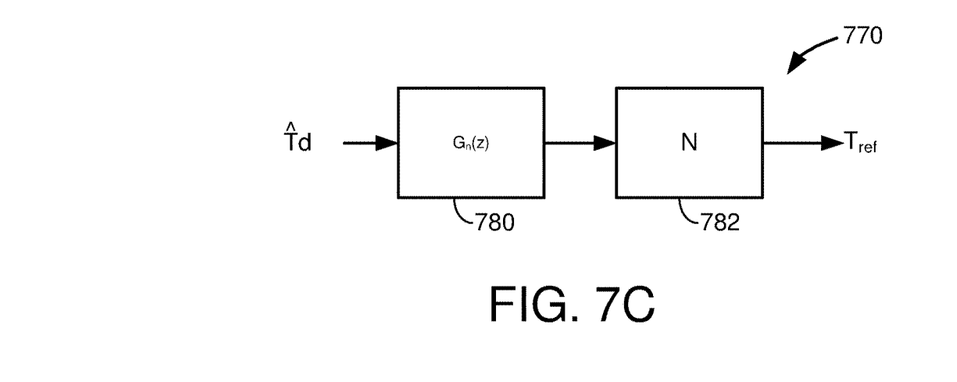
FIG. 7C shows a detailed second example of a temperature reference generator.
Figure 8:
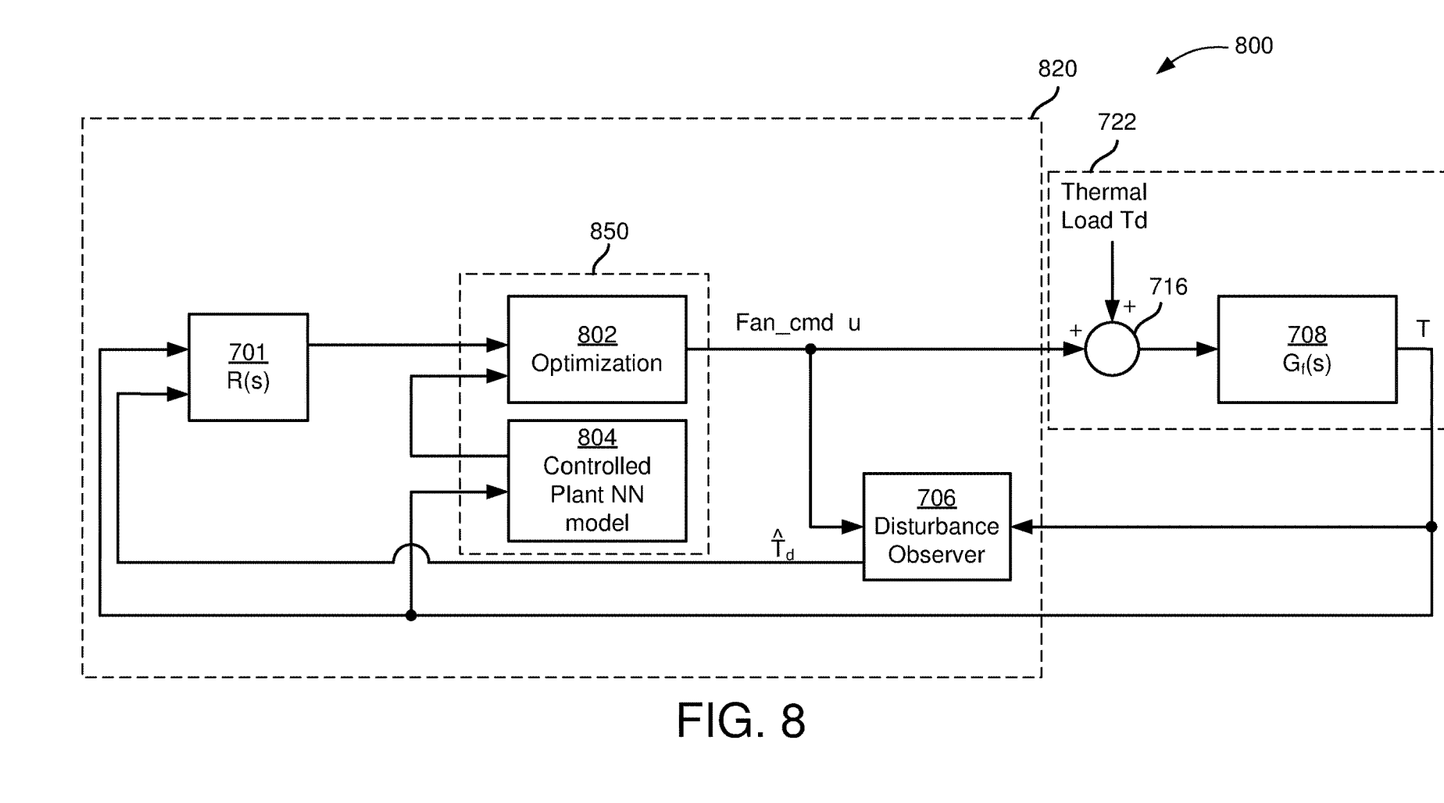
FIG. 8 shows a detailed block diagram of a second temperature and energy control system.
Figure 9:
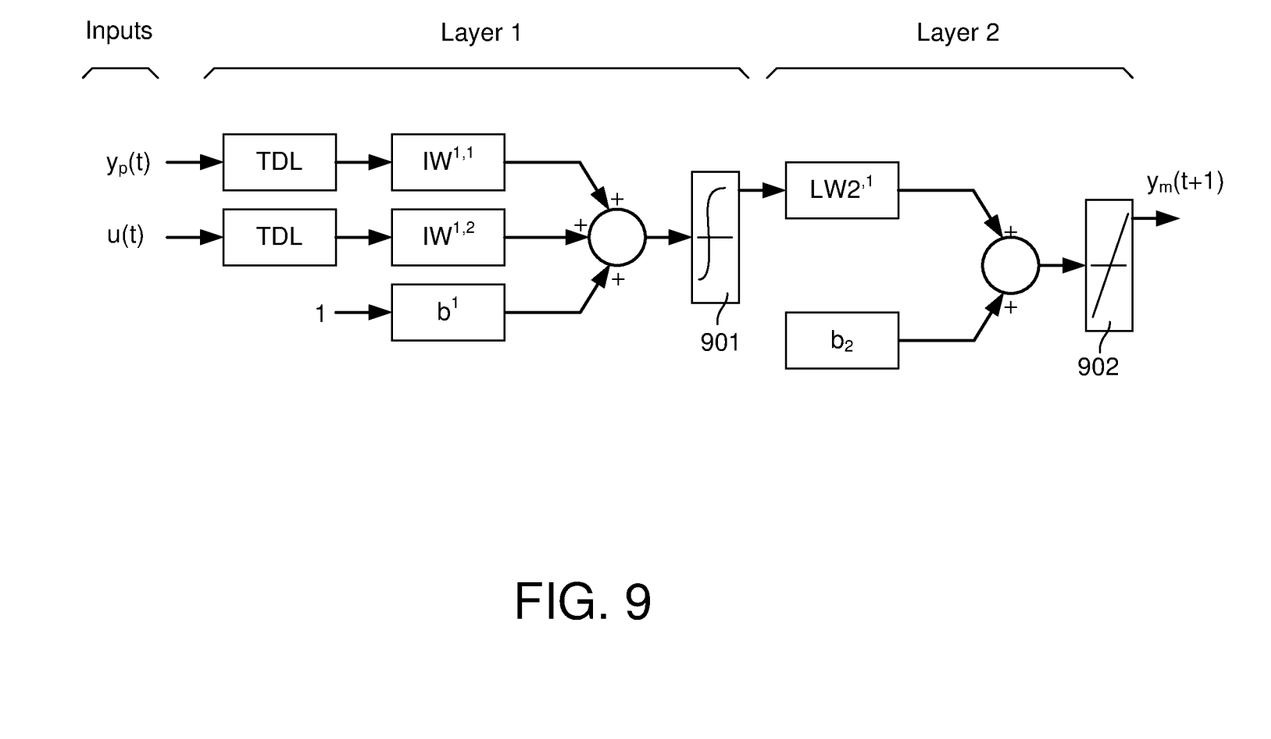
FIG. 9 shows a block diagram of a two layer neural network.
Figure 10:
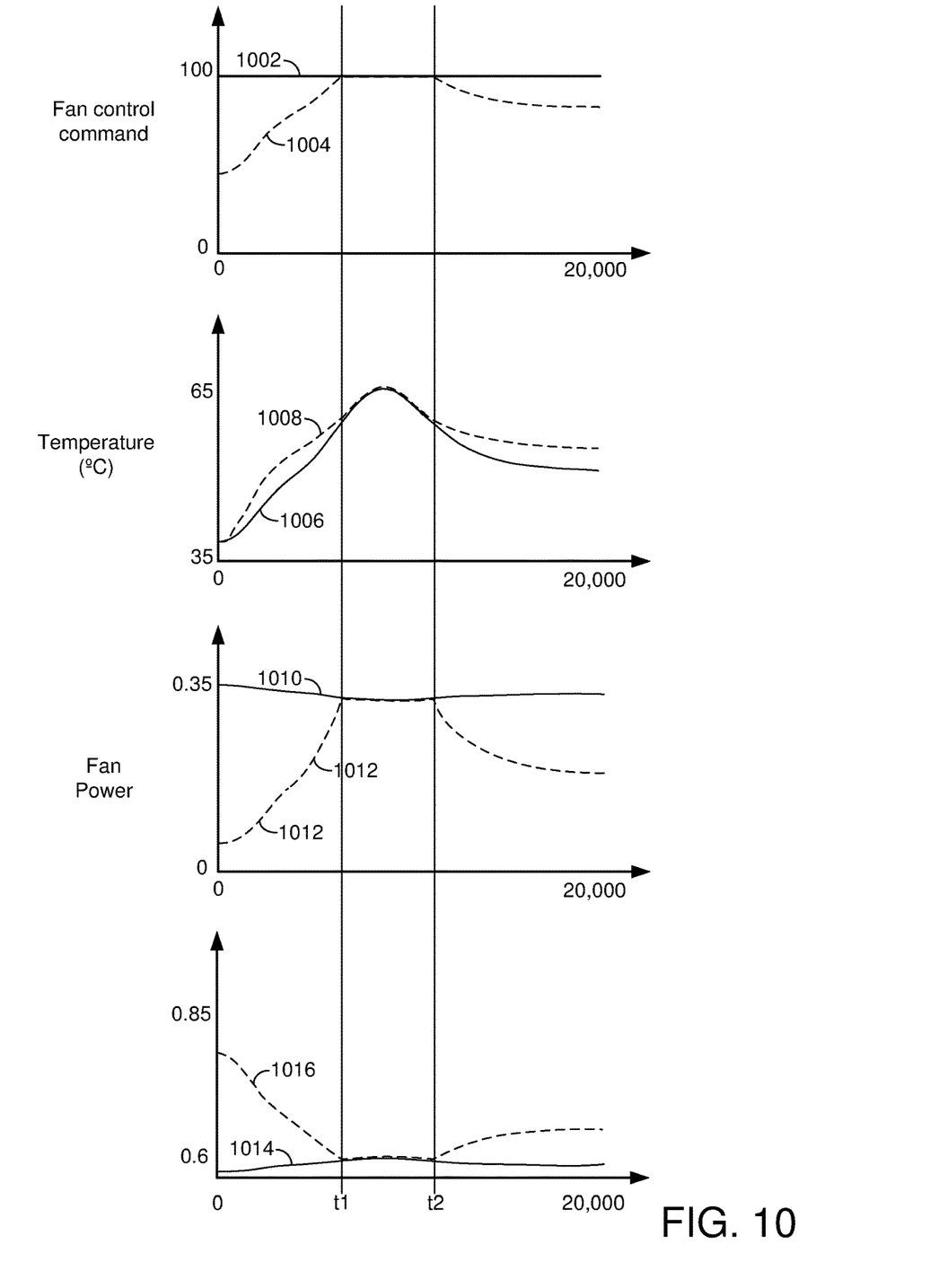
FIG. 10 shows plots of simulation results for the controller shown in FIG. 7A.

The present description is related to controlling a cooling system of a device. In particular, the method and system may be applied to a vehicle as shown in FIG. 1. The vehicle may be an electric vehicle, hybrid vehicle as shown in FIG. 2, or a fuel cell vehicle. The vehicle may include a cooling system for a device as shown in FIG. 3. Speed of a fan in the cooling system may be controlled as shown in FIG. 4. The cooling system may be described via a block diagram as shown in FIG. 5. A generalized block diagram of a controller for the cooling system is shown in FIG. 6. A detailed block diagram of the controller for the cooling system is shown in FIG. 7A. Example temperature reference generators are shown in FIGS. 7B and 7C. A block diagram of an alternative controller for the cooling system is shown in FIG. 8. A block diagram for a two layer neural network is shown in FIG. 9. Simulation results for the controller shown in FIG. 7A are shown in FIG. 10.

A vehicle may include a device that is cooled during operation of the device. The device may be an engine, electric machine, DC/DC converter, inverter, or other device that may generate heat. Such devices are often controlled to a predetermined temperature that is below a not to exceed temperature threshold of the device so as to reduce a possibility of device degradation. However, operating the device at the predetermined temperature may not allow a system that cools the device to operate at a minimum power level while maintaining a temperature of the device below the not to exceed temperature. In addition, it may be difficult to accurately model a cooling system of a device because of nonlinear uncertainties. Further, the nonlinear uncertainties and a large inertia of the cooling system may lead to undesirable levels of device temperature overshoot. Therefore, it may be desirable to provide a device cooling system that provides lower power consumption while regulating a temperature of the device below the not to exceed temperature threshold. In addition, it may be desirable to provide a device cooling system that is simple to implement and calibrate.

The inventors herein have recognized the above-mentioned disadvantages and have developed a method for operating a vehicle temperature control system, comprising: adjusting speeds of one or more devices via a controller in response to a temperature reference that is based on a thermal load of a first device. It should be noted that thermal load may be described as an amount of heat energy that is to be removed from a heat source and it may have units of kilojoules (kJ). Further, a thermal load rate may be described as a rate that heat energy is to be removed from a heat source and it may have units of kilowatts (kW). However, in this description and its claims, the phrase "thermal load" should be understood to be a rate (e.g., kilowatts) that heat energy is to be removed from the heat source.

By estimating a thermal load of a first device via a disturbance observer and adjusting a speed of a second device via a controller in response to a temperature that is based on the estimated thermal load of the first device, it may be possible to provide the technical result of cooling a device while allowing a device that cools to operate at a minimum power level. Further, the thermal load may be regarded as an external disturbance and it may be applied to determine an adjustable temperature set point so that the temperature of the first device may be adjusted according to the thermal load change of the first device. Therefore, the temperature reference may not be impacted by an initial temperature of the heat generating device (e.g., the first device) because the requested temperature set point is generated based on mainly the thermal load. The real temperature of the first device follows the requested temperature set point by using automatic feedback control. Thus, overshooting of the first device temperature may be avoided because of the effect that the requested temperature set point has on overshooting.

A controlled plant model under constant thermal load may be determined via system identification instead of creating a full controlled plant model according to the present invention, and the thermal load may be used to represent dynamic changes including nonlinearities, disturbances and noise. As such, modeling of the plant may be simplified and complexity of the control system may be reduced.

The present description may provide several advantages. In particular, the approach may reduce cooling system power consumption. Further, the approach may be robust to model uncertainties and nonlinearities. Additionally, the cooling control system may be tuned with little effort.

The above advantages and other advantages, and features of the present description will be readily apparent from this Detailed Description when taken alone or in connection with the accompanying drawings.

Referring to FIG. 1, a non-limiting vehicle 10 that includes an engine 12, an electrical machine 14, and an electrical energy storage device 11 is shown. In one example, the vehicle may be propelled solely via the engine 12, solely via an electrical machine 14, or by both the engine 12 and the electrical machine 14. In other examples, vehicle 10 may be an electric vehicle that does not include engine 12. In still other examples, vehicle 10 may be a fuel cell vehicle that generates electric power that is supplied to an electric machine which propels vehicle 10.

In this example, the electrical machine 14 may be supplied electrical power via the electrical energy storage device 11. The electrical energy storage device 11 may be recharged via the vehicle's kinetic energy or via engine 12 providing power to electrical machine 14. The electric machine 14 may convert the vehicle's kinetic energy or engine torque into electrical energy which may be stored in electric energy storage device 11. Electrical energy storage device 11 may also be recharged from a stationary power grid via a home charging system or a remote charging system (e.g., a charging station). In one example, electrical energy storage device 11 is a battery. Alternatively, electrical energy storage device 11 may be a capacitor or other storage device.

The vehicle 10 may include a driveline as shown in FIG. 2 or another suitable driveline to propel the vehicle 10 and/or power vehicle components. Vehicle 10 is shown with internal combustion engine 12, and it may be selectively coupled to an electric machine 14. Internal combustion engine 12 may combust petrol, diesel, alcohol, hydrogen, or a combination of fuels.

Referring now to FIG. 2, a block diagram of a vehicle driveline 200 in vehicle 10 is shown. Driveline 200 may be powered by engine 12. Engine 12 may be started with an engine starting system including starter 201 or via electric machine or driveline integrated starter generator (DISG) 14. Further, engine 12 may generate or adjust torque via torque actuator 219, such as a fuel injector, throttle, camshaft, etc.

Engine 12 includes a radiator 231 for dissipating engine waste heat. An engine output torque may be transmitted to driveline disconnect clutch 204. Driveline disconnect clutch 204 may be electrically or hydraulically actuated. The downstream side of driveline disconnect clutch 204 is shown mechanically coupled to DISG input shaft 203. Engine temperature may be determined via temperature sensor 12$t$.

DISG 14 may be operated to provide torque to driveline 200 or to convert driveline torque into electrical energy to be stored in electric energy storage device 11. DISG 14 has a power output that is greater than starter 201. Further, DISG 14 directly drives driveline 200 or is directly driven by driveline 200. There are no belts, gears, or chains to couple DISG 14 to driveline 200. Rather, DISG 14 rotates at the same rate as driveline 200. Electrical energy storage device 11 may be a battery, capacitor, or inductor. The downstream side of DISG 14 is mechanically coupled to transmission 208. DISG 14 may operate on or output alternating current (AC). The AC may be converted into direct current (DC) via inverter 13 and stored in electric energy storage device 11. A temperature of DISG 14 may be determined via temperature sensor 14$t$. A temperature of inverter 13 may be determined via temperature sensor 13$t$. A temperature of electric energy storage device may be determined via temperature sensor 11$t$.

Automatic transmission 208 includes gear clutches (e.g., gears 1-6) for adjusting a transmission gear ratio. The gear clutches 233 may be selectively engaged to propel vehicle 10. Torque output from the automatic transmission 208 may in turn be relayed to wheels 216 to propel the vehicle via output shaft 234. Output shaft 234 delivers torque from transmission 208 to wheels 216. Automatic transmission 208 may transfer an input driving torque to the wheels 216.

Further, a frictional force may be applied to wheels 216 by engaging wheel friction brakes 218. In one example, wheel friction brakes 218 may be engaged in response to the driver pressing his/her foot on a brake pedal (not shown). In other examples, controller 212 or a controller linked to controller 212 may engage wheel friction brakes. In the same way, a frictional force may be reduced to wheels 216 by disengaging wheel friction brakes 218 in response to the driver releasing his/her foot from a brake pedal. Further, vehicle brakes may apply a frictional force to wheels 216 via controller 212 as part of an automated engine stopping procedure.

Controller 212 may be programmed to receive inputs from engine 12 and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 212 may control the engine torque output by controlling a combination of fuel pulse width, fuel pulse timing, and air charge. In all cases, engine control may be performed on a cylinder-by-cylinder basis to control the engine torque output. Controller 212 may also control torque output and electrical energy production from DISG 14 by adjusting current flowing to and from DISG windings as is known in the art. Controller 212 may also control the device cooling system shown in FIG. 3 and the device cooling system may control cooling of a heat generating device such as engine 12, DISG 14, inverter 13, or electric energy storage device 11. Controller 212 may include read-only or non-transitory memory 212a, a central processing unit 212b, random-access memory 212c, and inputs and outputs 212d (e.g., digital, analog, timer/counter).

Referring now to FIG. 3, a block diagram of an example cooling system for a device is shown. Cooling system 300 includes a heat exchanger 313 (e.g., a radiator) that may transfer thermal energy from device 310 to ambient air or from one heat transfer medium (e.g., refrigerant or coolant) to another heat transfer medium. In some examples, heat exchanger 313 may be a radiator 231 as shown in FIG. 2. Device 310 may be an engine, electric machine, inverter, battery, DC/DC convertor or other device that generates heat from time to time. Cooling system 300 is shown with a degas bottle 304 and a fan 302. Fan 302 may be driven via a machine 305 (e.g., an electric motor) such that ambient air passes through heat exchanger 231 to remove thermal energy from device 310. Pump 312 may provide motive force to circulate a liquid coolant through heat exchanger 231 and device 310. Pump 312 may be an electrically driven pump. Controller 212 may command the speed of pump 312 and the speed of fan motor 305.

The systems of FIGS. 1-3 provide for a cooling system, comprising: a heat generating device; one or more temperature control devices configured to control a temperature of the heat generating device; and a controller including executable instructions stored in non-transitory memory that cause the controller to adjust the temperature control device responsive to a thermal load estimate of the heat generating device output via a disturbance observer and a temperature reference generated via a temperature reference generator. The cooling system includes where the one or more temperature control devices include a fan and a pump, and further comprising additional executable instructions stored in non-transitory memory to command the pump to a variable speed. The cooling system includes where the cooling system is in a vehicle and where the disturbance observer includes an inverse transfer function of a controlled plant model that is under constant thermal load with a fan speed input and a temperature output of the heat generating device. The cooling system includes where the temperature reference generator is based on a dynamic output state observer, the observer being a Kalman filter that includes a gain matrix that multiplies a difference between a temperature of the heat generating device and an estimated temperature of the heat generating device. The cooling system includes where the heat generating device is a motor or an inverter. The cooling system includes where the Kalman filter includes a unit delay. The cooling system includes where the controller includes a neural network that receives the temperature reference and a temperature of the heat generating device to adjust a fan speed command so that the temperature of the heat generating device tracks the temperature reference.

Referring now to FIG. 4, a plot that illustrates fan motor speed commands as a function of ambient temperature and thermal load of the device (e.g., inventors define thermal load here) that is being cooled (e.g., 310 of FIG. 3). The vertical axis represents the thermal load of the device being cooled and the thermal load increases in the direction of the vertical axis arrow. The horizontal axis represents ambient temperature and ambient temperature increases in the direction of the horizontal axis arrow.

Region 402 is denoted via the area covered in horizontal lines and it represents a region where a thermal load is managed by adjusting fan speed to zero. The fan speed is set to zero since the thermal load of the device being cooled is low and ambient temperature is low. By operating the fan with zero speed, energy consumption by the fan is low. Speed of the fan (e.g., 302 of FIG. 3) is increased to greater than zero for thermal loads and ambient temperatures that are to the right of line 412.

Region 404 is denoted by the cross hatching and it represents a region where the thermal load is managed via an adjustable fan speed. For example, at lower thermal loads in region 404, fan speed may be set low (e.g., greater than 0% of maximum fan speed). At higher thermal loads in region 404, fan speed may be set higher (e.g., less than 100% of maximum fan speed). Speed of the fan is increased to greater than zero and less than maximum speed for thermal loads and ambient temperatures that are right of line 412 and left of line 410. In range 404, it is desired to adjust fan speed to maintain a temperature of a heat generating device below a not to exceed threshold temperature with minimal power consumption by the fan so that system efficiency may be improved.

Region 406 is denoted with the absence of hatching lines and it represents a region where a thermal load is managed by adjusting fan speed to maximum fan speed. The fan speed is set to maximum since the thermal load of the device being cooled is high. By operating the fan with maximum speed, it may be possible to reduce a temperature of the device in which a temperature is being controlled. Speed of the fan is increased to maximum for thermal loads and ambient temperatures that are right of line 410.

Referring now to FIG. 5, a simplified block diagram of a controlled plant is shown. Plant 500 includes a fan and fan motor 502 (e.g., 305 of FIG. 3), a heat exchanger 504 (e.g., 313 of FIG. 3), an electrically driven coolant pump 506 (e.g., 312 of FIG. 3), and a heat generating device that is being cooled 508 (e.g., a traction motor 310 of FIG. 3). The controlled plant 500 includes inputs for fan speed and pump speed. The controlled plant 500 outputs a temperature of the heat generating device being cooled. The controlled plant 500 may be expressed via the following equation:

$$T(s) = G(s) \begin{bmatrix} u_{fan}(s) \\ u_{pump}(s) \end{bmatrix} = G_f(s) u_{fan}(s) + G_p(s) u_{pump}(s)$$

where s is a complex number, T is temperature output of the controlled plant (e.g., the heat generating device), G(s) is a transfer function of the controlled plant, $u_{fan}$ is fan speed input command, $u_{pump}$ is pump speed input command, $G_f$ is a transfer function from the speed command input $u_{fan}$ of the fan system (e.g., fan and fan drive) to the temperature output T of the heat generating device, and $G_p$ is the transfer function from the speed command input $u_{pump}$ of the pump system (e.g., pump and pump drive) to the temperature output T of the heat generating device.

Referring now to FIG. 6, a generalized block diagram of a temperature and energy control system 600 for a cooling system of a heat generating device is shown. Portions of the controller related blocks shown in FIG. 6 may be realized as executable instructions stored in non-transitory memory of a controller. The controller (e.g., 212) may adjust operating states of devices in the physical world to control a device and/or system according to blocks in the block diagram.

Block diagram 600 includes block 606 and block 606 represents the controlled plant (e.g., the heat generating device). The controlled plant is represented via a transfer function G(s), which is expressed in the Laplace transform of the time domain dynamic G(t) where s is a complex variable that may include real and imaginary parts. The controlled plant 606 may include the devices as described in block diagram 500 of FIG. 5. In one example, controlled plant 606 may be represented via a linear model and nonlinearities with fan and pump speed commands as inputs. Outputs of the controlled plant may include the thermal load of the controlled plant, the temperature of the controlled plant, and a power consumption variable of the controlled plant. The thermal load of the plant may be regarded as a disturbance and estimated by a disturbance observe as discussed in the description of FIG. 7A. The power consumption variables (e.g., voltage, current, motor power, etc.) may be determined from sensors that measure operating conditions of the plant. The temperature of the device T may be measured via a thermocouple, thermistor, or other known temperature sensing device. The thermal load, power consumption variable, and temperature (T) are output to temperature reference generating block 602.

At block 602, a temperature reference (e.g., a requested temperature or a set point for the heating device temperature) is generated. In one example, the temperature reference may be generated according to the temperature reference generators described in FIGS. 7B and 7C. The temperature reference is output from block 602 to summing junction 603 where the temperature of the plant (e.g., the device having a temperature that is controlled) is subtracted from the temperature reference to produce a temperature error. The summing junction 603 outputs a temperature error to the fan and pump controller that is represented by block 604.

At block 604, fan and pump speeds are generated according to the temperature error that is output from summing junction 603. In one example, as described in further detail with respect to FIG. 7A, the fan and pump speed controller includes feedforward control and feedback control. In another example, as described in further detail with respect to FIG. 8, the fan and pump speed controller includes a neural network. The neural network may or may not include feedforward control. The fan and pump speed controller outputs a fan speed command to summing junction 605. In addition, the fan and pump speed controller outputs a pump speed command to summing junction 607.

At summing junction 605, the fan speed command that is output from block 604 is added with a fan speed disturbance to generate an actual fan speed control signal or command. The fan speed disturbance may represent nonlinearities that may be caused by nonlinear dynamics. Summing junction 605 outputs the actual fan speed control signal or command to the controlled plant at block 606.

At summing junction 607, the pump speed command that is output from block 604 is added with a pump speed disturbance to generate an actual pump speed signal or command. The pump speed disturbance may represent nonlinearities that may be caused by nonlinear dynamics. Summing junction 607 outputs the actual pump speed signal or command to the controlled plant at block 606.

Thus, the generalized block diagram of FIG. 6 includes a temperature reference generator and the temperature reference generator outputs a requested temperature for the heat generating device that is under control or a set point for the heat generating device. The temperature may be based on a thermal load of the heat generating device and a temperature of the heat generating device.

Referring now to FIG. 7A, a detailed realized example of the control system of FIG. 6 is shown. In this example, control system 700 is configured with temperature feedforward and feedback loops. The controller related blocks 720 shown in FIG. 7A may be implemented as executable instructions stored in non-transitory memory of a controller. The controller (e.g., 212) may adjust operating states of devices in the physical world to control a device and/or system according to operations of blocks in the block diagram.

In this example, the pump speed command (not shown) is set to a fixed constant value in selected temperature zones of the device having its temperature controlled since the effect of pump speed on system power consumption is very low as compared to fan speed. For example, the pump speed may be set to a maximum or 100% of its rated speed when a temperature of the device in which temperature is controlled is greater than 30° C. In addition, the power consumption related variables shown in FIG. 6 are not applied in this example to illustrate that the control system may provide desirable results even omitting parameters that may influence system operation.

Block diagram 700 includes a transfer function $G_f(s)$ from a fan speed command input to the temperature output of the heat generating device, and the transfer function is represented by block 708 is included in the controlled plant 722 where the thermal load that is generated in $G_f(s)$ 708 is regarded as an external disturbance and it is added to summing junction 716. It should be understood that there is a unit conversion from fan speed command u to 716 to convert fan speed (rpm) to power [kW] and it is not captured in FIG. 7A. The transfer function $G_f(s)$ is expressed in the Laplace transform of the time domain dynamic $G_f(t)$. $G_f(s)$ in FIG. 7 is G(s) in FIG. 6. The fan and pump provide cooling to the controlled plant 722 and temperature (T) of the controlled plant may be affected by operation of the fan and pump (even though pump speed is setup as a constant value). The controlled plant may include the devices as described in block diagram 500 of FIG. 5. The plant temperature (T) is output and delivered to disturbance observer 706, summing junction 710, and temperature reference generator block 701.

At disturbance observer block 706, the thermal load $T_d$ of the controlled plant is estimated according to the fan command u that is output from summing junction 712 and the temperature of the plant (T). Block 706 outputs the estimated thermal load $\hat{T}_d$ to be fed to temperature reference generator block 701 and feedforward block 702. The disturbance observer of block 706 may be expressed via the following equation:

$$\hat{T}_d(s) = F(s)(u(s) - G_f^{-1}(s)T(s))$$

where $\hat{T}_d$ is the estimated thermal load of the controlled plant, F(s) is a transfer function of a low pass filter for reconstructing $T_d(s)$ because $G_f^{-1}(s)$ is generally not proper, u(s) is the fan speed command, $G_f^{-1}(s)$ is the inverse transfer function of the transfer function between a fan speed command u and temperature (T) of the device that is being temperature controlled (e.g., the heat generating device or plant), and T(s) is temperature output of the plant.

In other examples, the thermal load may be empirically determined according to plant operation on a dynamometer from plant torque and plant speed, where the plant may be an electric motor.

At temperature reference generating block 701, the temperature reference value $T_{ref}$ (e.g., the temperature set point or requested temperature) may be determined from a dynamic transfer function (e.g., as discussed with reference to 7B and FIG. 7C) that characterizes fan power consumption based on the thermal load estimate that is output from disturbance observer block 706. The temperature set point $T_{ref}$ is a reference temperature trajectory that the controlled plant is regulated so that the plant temperature T completely follows its reference temperature $T_{ref}$. The temperature reference $T_{ref}$ is output from block 701 to summing junction 710 where the temperature of the plant (T) (e.g., the heat generating device having a temperature that is controlled) is subtracted from the temperature reference to produce a temperature error e. The summing junction 710 outputs a temperature error e to the fan controller that is represented by block 704. The output e of summing junction 710 is input to the feedback controller at block 704. In one example, the feedback controller 704 may be a proportional/integral/derivative (PID) controller, which may be expressed via the following equation:

$$u(s) = K_p + \frac{K_i}{s} + K_d s$$

where u (s) is the fan speed command in the Laplace domain of the time domain dynamic u(t), Kp is the proportional gain (e.g., a scalar), $K_i$ is the integral gain (e.g., a scalar), and $K_d$ is the derivative gain (e.g., a scalar). In other examples, the feedback controller 704 may take other forms such as a linear quadratic regulator, fuzzy logic based controller, and neural network (NN) based controller, etc. Feedback controller block 704 outputs a feedback fan speed command $u_{fd}$ to summing junction 712.

The estimated thermal load $\hat{T}_d$ output from block 706 is input to feedforward block 702 where it is multiplied by a feedforward gain K (e.g., a scalar) to generate a feed forward fan speed command $u_{feed}$. Operation of block 706 may be expressed via the following equation:

$$u_{feed} = K \cdot \hat{T}_d$$

where K is the feedforward gain, $u_{feed}$ is the feedforward fan speed command, and $\hat{T}_d$ is the estimated thermal load of the controlled plant. The feedforward fan speed is output to summing junction 712.

At summing junction 712, the feedforward fan speed command $u_{feed}$ is added to the feedback fan speed command $u_{fd}$ to generate the fan speed command u. The fan speed command u is delivered to the controlled plant 722. The controller consisting of the feedforward control 702 and the feedback control 704 with fan command output u operates to compensate the temperature error e caused by the changes of the controlled plant, including the thermal load $T_d$ of the controlled plant 708. Thus, if the thermal load $T_d$ increases, fan speed may be increased to cool the plant. If $T_d$ decreases, fan speed may be decreased by the automatic control of feedforward and feedback controllers to conserve energy that may be consumed by the controlled plant as compared with controlling the temperature to a fixed constant value or controlling the temperature in a range of the threshold temperature.

Thus, the controller of FIG. 7A provides the benefit of its reference temperature $T_{ref}$ not being impacted by the initial temperature of the controlled plant because the $T_{ref}$ is generated based on mainly the thermal load. The same thermal load value in the controlled plant can cause different temperature reference values when the initial temperature values are different. This indicates that the thermal load based temperature reference has included initial temperature effect. Another benefit of the control system shown in FIG. 7A is that it avoids the temperature T overshooting which may be happened in many other thermal control systems. The reason is that the control system 700 is a feedback control system and its controlled temperature T tracks its reference temperature $T_{ref}$ that never generates overshooting reference. Consequently, the variable temperature reference that is based on thermal load may be more beneficial than applying a fixed constant temperature value or a range of the threshold temperature.

Referring now to FIG. 7B, a block diagram of a first temperature reference generator 730 is shown. The temperature reference generator of FIG. 7B may be included in the systems of FIGS. 6, 7A, and 8. In particular, the temperature reference generator 730 may be the temperature reference generator 602 of FIG. 6, temperature reference generator 701 of FIG. 7A, or temperature reference generator 701 of FIG. 8.

The temperature reference generator 730 is an observer-based temperature reference generator. The observer may be for linear or nonlinear dynamic systems, such as different types of Kalman filters, a H-infinity estimator, a Luenberger observer, a PI-based observer, and others that provide a feasible framework to filter the noise and estimate the system states. In this implementation, a linear system Kalman filter is applied to describe the algorithm. Note that the Kalman filter is described with a discrete-time equation where k is a sample number. The linear stochastic discrete-time controlled plant 708 under the effect of the constant thermal load can be expressed as the following state equation: x(k)=Ax(k−1)+Bu(k)+w(k), where k=0, 1, 2 . . . , and a measurement equation: y(k)=Cx(k)+v(k), where x(k) is state variable to be estimated and it is temperature in this algorithm, y(k)=T is the measured temperature from temperature sensor of the controlled plant 708, w(k) is unknown zero mean white process noise, v(k) is unknown zero mean white measurement noise, and (A, B, C) are constant matrices describing the controlled plant model. The linear model of the controlled plant under the constant thermal load can be obtained based on the system identification technology from the test data captured from a test vehicle or a dynamometer. In one example, the controlled plant model under the constant thermal load may be approximated as the first order system model.

The Kalman filter algorithm does not require all historical data, but only previous state information to make a prediction about the actual state of the system. FIG. 7B shows a schematic block diagram of the proposed temperature reference generator.

The temperature reference generator 730 generates a requested temperature reference $T_{ref}$ that is adjustable. The temperature reference generator 730 R(s) receives the estimated thermal load $\hat{T}_d$ and the measured temperature T of the heat generating device under temperature control (e.g., the plant, which may be a motor, engine, inverter, etc.). The temperature reference generator 730 generates the output $T_{ref}$ or the temperature reference. The thermal load change may cause temperature change of the controlled closed system shown in FIG. 7A. Because the thermal load $\hat{T}_d$ change may be much quicker than the change of temperature T, the reference of temperature $T_{ref}$ has dynamic characteristics for its estimated thermal load $\hat{T}_d$ and it has at least one time step ahead prediction for the temperature T (e.g., one time interval between time samples k).

FIG. 7B is a schematic block diagram of temperature reference generator 730 that is based on a first algorithm. In FIG. 7B, inputs $u(k) = \hat{T}_d$ represents the estimated thermal load of the plant and y(k)=T represents the measured temperature (e.g., a temperature sensed via a plant temperature sensor, and temperature reference generator 730 output $\hat{y}(k)$ is the estimated temperature output of the controlled plant 708 under temperature control. Input u(k) is provided to block 750 where it is multiplied by matrix B. The output of block 750 is added with the output of block 756 and the output of block 762. The temperature difference Δŷ(k) between the measured temperature y(k) and the estimated temperature ŷ(k) is output from summing junction 760 and it is used as input to block 762 where it is multiplied by gain K (e.g., a real number scalar) with output r(k). The output r(k) of the Kalman filter gain K at summing junction 752 is r(k)=[y(k)−ŷ(k)]=K[y(k)−Cx̂(k)]. The output of summing junction 752 is input to block 754 where it is delayed by one time step to generate the state x̂(k). The state x̂(k) is input to block 758 and block 756, where it is multiplied by matrix A and matrix C. The output of block 758 is the estimated temperature output of the controlled plant. The estimation error may be minimized by adjusting the value of K according to Δŷ(k) automatically in the loop shown in FIG. 7B. The model (as described by matrices A, B, C) may be described as the first order system, where C=1, and the estimated output variable ŷ(k)=x̂(k). Thus, one step ahead prediction may be applied such that $T_{ref}=\hat{x}(k+1)$.

FIG. 7C is a schematic block diagram of temperature reference generator 770 that is based on a second algorithm. The second temperature reference generator 770 may be the temperature reference generator 701 in FIG. 7A. Referring now to FIG. 7C, a pre-defined temperature reference $T_{ref}$ may be generated by the dynamic model $G_n(z)$ 780 under the constant thermal load and scaling curve N 782. The dynamic model $G_n(z)$ may be obtained from the test data that is captured from the controlled plant and used model identification method. For example, a step input of fan speed command may be applied to the controlled plant so that the temperature of the controlled plant under the constant thermal load may respond to the step input of fan speed command. The data generated from the step response may be a basis for modeling the dynamic $G_n(z)$ 780 in the temperature reference generator.

In one example, the step temperature response of the controlled plant under constant thermal load may be approximated by a first order system that is $$G_{fs}(s) = \frac{K}{Ts+1},$$

where $G_{fs}(s)$ is the transfer function in the frequency domain that represents system dynamics, s is a complex number, T is the system time constant in a certain constant thermal load, and K is a scalar gain. Based on $$G_{fs}(s) = \frac{K}{Ts+1},$$

the transfer function $$G_n(s) = \frac{K}{T_1 s+1}$$

in the temperature reference generator may be determined, where $T_1 < T$, and it means that the response time of $G_n(s)$ is quicker than that of $G_{fs}(s)$, that is, the reference temperature time response $T_{ref}$ leads to the time response of real temperature T, to achieve in the goal to be a reference. Generally, $T_1$ can be chosen to be higher 90% and less 100% than T. The magnitude of temperature response of the controlled plant under a series of constant thermal loads shown in FIG. 7C is normally nonlinear. Therefore, a lookup table N may represent the scaling for nonlinear part of by scaling the magnitude K change in the different operating point, such as 30C, 40C, etc. Block 782 represents the lookup table for scaling value of K.

Referring now to FIG. 8, an alternative detailed example of the control system of FIG. 6 is shown. In this example, the controller 850 in the control system 800 is configured with a neural network based controller, in particular, neural network predictive controller for the nonlinear controlled plant 708. However, fuzzy logic based and other model-free controllers may be applied to implement the system controls. All blocks in 820 shown in FIG. 8 may be realized as executable instructions stored in non-transitory memory of a controller. The controller 850 (e.g., 212) may adjust operating states of devices in the physical world to control a device and/or system according to operations of blocks in the block diagram.

In this example, the pump speed command (not shown) is also set to a fixed constant value in selected temperature zones of the device having its temperature controlled since the effect of pump speed on system power consumption is very low as compared to fan speed.

Block diagram 800 includes a transfer function $G_f(s)$ from fan speed command input u to the temperature output T of the heat generating device and is represented by block 708 that is included in the controlled plant 722. The transfer function $G_f(s)$ is expressed in the Laplace transform of the time domain dynamic $G_f(t)$. The fan and pump provide cooling to the controlled plant 722 and temperature (T) of the controlled plant may be affected by operation of the fan and pump. In this example, the pump speed is held at a constant value. The controlled plant may include the devices as described in block diagram 500 of FIG. 5. The plant temperature (T) is output and delivered to disturbance observer 706 and temperature reference generator block 701.

At disturbance observer block 706, the thermal load $T_d$ of the controlled plant 722 is estimated according to the fan command that is output from neural network predictive controller 850 and the temperature (T) of the controlled plant. Block 706 outputs the estimated thermal load $\hat{T}_d$ to temperature reference generator block 701. The disturbance observer of block 706 may be expressed via the following equation:

$$\hat{T}_d(s) = F(s)(u(s) - G_f^{-1}(s)T(s))$$

where $\hat{T}_d(s)$ is the estimated thermal load of the controlled plant, F(s) is a transfer function of a low pass filter for reconstructing $\hat{T}_d(s)$ because $G_f^{-1}(s)$ is generally not proper, u is the fan speed command, $G_f^{-1}(s)$ is the inverse transfer function of the controlled plant, and T(s) is temperature output of the controlled plant.

In other examples, the thermal load may be empirically determined according to plant operation on a dynamometer from plant torque and plant speed, where the plant may be an electric motor.

At temperature reference generating block 701, the temperature reference value may be determined from a dynamic transfer function as previously described that characterizes fan power consumption based on the thermal load estimate that is output from disturbance observer block 706. The temperature reference is output to the optimization section 802 of neural network predictive controller 850.

The neural network predictive controller 850 may include a neural network model 804 that is trained via machine learning in off-line technology based on the test data including fan speed command u and temperature T of the controlled plant from test vehicles. The neural network training signal is a prediction error between controlled plant output temperature T and neural network model output. The neural network model uses previous inputs and previous plant output to predict future values of the controlled plant model output. The neural network model 804 may be structured as shown in FIG. 9. In particular, as shown in FIG. 9, the neural network model 804 may include inputs (e.g., controlled plant output temperature variable T and fan speed command control variable u). The neural network model 804 also includes a first layer that includes a tapped delay line (TDL), input weight (IW) matrix, bias vector b, and a transfer function 901. The neural network model may also include a second layer that includes a layer weight (LW), bias vector b, and a linear transfer function 902. The neural network model outputs a model estimation variable $y_m(t+1)$ that represents the predicted temperature and it is used to predict the controlled plant response over a specified time horizon.

The neural network optimization section 802 shown in FIG. 8 may apply a receding horizon technique to predict the controlled plant response over a specified time horizon. The predictions may be used by a numerical optimization program to determine the fan command u that minimizes the following criterion J over the specified horizon:

$$J = \sum_{j=N_1}^{N_2} (y_r(t+j) - y_m(t+j))^2 + \rho \sum_{j=1}^{N_u} (u(t+J-1) - u(t+j-2))^2$$

where $N_1$, $N_2$, and $N_u$ define the horizons over which a tracking error and the control increments are evaluated. The variable u is the tentative control signal and it is fan speed control command, $y_r=T_{ref}$ is the requested reference response and it is temperature reference, and $y_m=T_m$ is the model response and it is temperature. The value of $\rho$ determines the contribution that the sum of squares of the control increments has on the performance index. The optimized fan speed command u is output from the neural network predictive controller 850 that is input to the disturbance observer 706 and the controlled plant 722. The fan speed command output u operates to compensate the error (not show in FIG. 8) between the temperature reference $T_{ref}$ and real temperature T caused by the changes of the thermal load Td in the controlled plant 722. Thus, if $T_d$ increases, fan speed command may be increased to cool the plant. If $T_d$ decreases, fan speed may be decreased by the automatic control of neural network predictive controller to conserve energy that may be consumed by the controlled plant as compared with controlling the temperature to a fixed constant value or controlling the temperature in a range of the threshold temperature.

Thus, the controller 850 of FIG. 8 provides the benefit of adjusting fan control command output according to a predicted plant response. Accordingly, the fan speed may be increased when the plant temperature is expected to rise and the fan speed may be decreased when the plant temperature is expected to decrease.

The block diagrams shown herein provide for a method for operating a vehicle temperature control system, comprising: adjusting speeds of one or more devices via a controller in response to a temperature reference that is based on a thermal load of a first device. The method includes where the thermal load is estimated via a disturbance observer, and where the first device is an electric machine that provides propulsive effort for a vehicle. The method includes where the one or more devices include a fan and a pump, and where adjusting speeds of the one or more devices includes adjusting speeds of the one or more devices to track the temperature reference. The method includes where the disturbance observer includes an inverse transfer function of a controlled plant model that is under constant thermal load. The method includes where the inverse transfer function is an inverse transfer function between a fan speed command from a controller output and a temperature of the first device. The method includes where the disturbance observer includes a transfer function of a low pass filter. The method includes where the disturbance observer outputs an estimated thermal load value that is based on a temperature of the first device and a fan speed command from a controller.

The block diagrams shown herein also provide for a method for operating a vehicle temperature control system, comprising: generating a requested temperature via a temperature reference generator; and adjusting a speed of a second device via a controller in response to a temperature that is based on an output of the temperature reference generator. The method includes where the temperature reference generator is formed as an observer, and further comprising: a dynamic observer including an estimated thermal load generated by the disturbance observer and input to the observer along with a temperature of a heating generating device. The method includes where the disturbance observer outputs a thermal load estimate of a heat generating device. The method includes where the observer includes a difference between a temperature of the heat generating device and an output of the observer that is multiplied via an observer gain. The method includes where the observer includes a unit delay and a controlled plant model that is under constant thermal load with A, B, and C matrices. The method includes where temperature reference generator outputs a requested temperature of a heat generating device and further comprising: adjusting a speed of a second device via the controller to track the requested temperature.

In some examples, the temperature reference generator may also formed as a pre-defined dynamic model under the constant thermal load and scaling gain under different constant load values. A pre-defined dynamic model may be obtained from the test data that is measured from the controlled plant using system identification methods. Based on the identified controlled plant model under constant model, the pre-defined dynamic model is determined and it has a led time response of real temperature T.

Referring now to FIG. 10, simulation results for the control system 700 of FIG. 7A are shown. The plots of FIG. 10 may be generated according to the controller of FIG. 7A and the system of FIGS. 1-3. The plots of FIG. 10 are time aligned and generated from a same simulation.

The first plot from the top of FIG. 10 is a plot of fan speed command percentage, where 100% is maximum fan speed and 0% is zero fan speed, versus time. The vertical axis represents the fan command and the fan command increases in the direction of the vertical axis arrow. The horizontal axis represents time and time increases from the left side of the figure to the right side of the figure. The solid line 1002 represents when the fan speed command is set at a constant value of 100%. The dashed line 1004 represents the fan speed control command u from the controller 720 of FIG. 7A.

The second plot from the top of FIG. 10 is a plot of plant temperature (T) versus time. The plant temperature increases in the direction of the vertical axis arrow. The time increases from the left side of the figure to the right side of the figure. The solid line 1006 represents when the plant temperature when the fan speed command is set at a constant value of 100%. The dashed line 1008 represents the controlled plant temperature according to when fan speed is controlled via the controller 720 of FIG. 7A.

The third plot from the top of FIG. 10 is a plot of fan power versus time. The fan power increases in the direction of the vertical axis arrow. The time increases from the left side of the figure to the right side of the figure. The solid line 1010 represents when the fan power when the fan speed command is set at a constant value of 100%. The dashed line 1012 represents the fan power when fan speed is controlled according to the controller 720 of FIG. 7A.

The fourth plot from the top of FIG. 10 is a plot of heat exchanger effectiveness versus time. The heat exchanger effectiveness increases in the direction of the vertical axis arrow. The time increases from the left side of the figure to the right side of the figure. The solid line 1014 represents when the heat exchanger effectiveness when the fan speed command is set at a constant value of 100%. The dashed line 1016 represents the heat exchanger effectiveness according to when fan speed is controlled via the controller 720 of FIG. 7A.

It may be observed that fan speed is reduced to lower the fan power consumption objective (e.g., minimum fan power to cool plant below not to exceed threshold temperature) by using the controller 720 of FIG. 7A during the time intervals t0-t1 and after time t2. Lowering the fan speed allows the plant temperature (T) to increase without exceeding a threshold level (not shown). During the time interval between time t1 and time t2, the fan speed is set to 100% (maximum capability of fan) via the controller of FIG. 7A when the thermal load has increased so that the controller 720 has to output the 100% maximum speed to cool the controlled plant and the temperature is controlled in the allowed maximum temperature range without temperature overshoot.

It may also be observed that the fan power and heat exchanger effectiveness may be improved according to the controller of FIG. 7A as compared to adjusting fan speed to a constant 100%. In particular, between time t0 and time t1, the fan power is lowered since fan speed is lowered and heat exchanger effectiveness is increased. Further, between time t1 and time t2, the fan power is lowered since fan speed is lowered and heat exchanger effectiveness is increased.

Thus, the present system and methods may provide for reduced actuator (e.g., fan or pump) power consumption and increased heat exchanger effectiveness. Further, the controlled plant may be controlled to a temperature that is less than a maximum not to exceed maximum requested temperature.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, vehicles including electric, hybrid, or internal combustion engine propulsion systems could use the present description to advantage.

The invention claimed is:

1. A method for operating a vehicle temperature control system, comprising:
adjusting a speed of a fan or a pump via a controller in response to a temperature reference that is based on a thermal load of a first driveline device, where the thermal load is estimated via a disturbance observer, where the first driveline device is an electric machine that provides propulsive effort for a vehicle, and where the disturbance observer outputs an estimated thermal load value that is based on a temperature of the first driveline device and a fan speed command from a controller.

2. The method of claim 1, where adjusting a speed of the fan or pump includes adjusting the speed of the fan or pump to track the temperature reference.

3. The method of claim 1, where the disturbance observer includes an inverse transfer function of a controlled plant model that is under constant thermal load.

4. The method of claim 3, where the inverse transfer function is an inverse transfer function between a fan speed command from a controller output and a temperature of the first driveline device.

5. The method of claim 1, where the disturbance observer includes a transfer function of a low pass filter.

6. A cooling system, comprising:
an electric machine;
one or more temperature control devices configured to control a temperature of the electric machine; and
a controller including executable instructions stored in non-transitory memory that cause the controller to adjust the temperature control device responsive to a thermal load estimate of the electric machine via a disturbance observer and a temperature reference generated via a temperature reference generator, where the temperature reference generator is based on a dynamic output state observer, the observer being a Kalman filter that includes a gain matrix that multiplies a difference between a temperature of the heat generating device and an estimated temperature of the heat generating device, and where the Kalman filter includes a unit delay.

7. The cooling system of claim 6, where the one or more temperature control devices include a fan and a pump, and further comprising additional executable instructions stored in non-transitory memory to command the pump to a variable speed.

8. The cooling system of claim 6, where the cooling system is in a vehicle and where the disturbance observer includes an inverse transfer function of a controlled plant model that is under constant thermal load with a fan speed input and a temperature output of the heat generating device.

9. The cooling system of claim 6, where the controller includes a neural network that receives the temperature reference and a temperature of the electric machine to adjust a fan speed command so that the temperature of the electric machine tracks the temperature reference.

10. A method for operating a vehicle temperature control system, comprising:
via a controller,
estimating a thermal load of a driveline device;
generating a requested temperature via a temperature reference generator, the temperature reference generator including an input for a measured temperature of the driveline device and the thermal load; and
adjusting a speed of a fan or pump via a controller in response to the requested temperature.

11. The method of claim 10, where the temperature reference generator is formed as an observer, and further comprising:
a disturbance observer including an estimated thermal load generated by the disturbance observer and input to the disturbance observer along with a temperature of a heating generating device.

12. The method of claim 11, where the disturbance observer outputs a thermal load estimate of a heat generating device.

13. The method of claim 11, where the disturbance observer includes a difference between a temperature of the driveline device and an output of the disturbance observer that is multiplied via an observer gain.

14. The method of claim 13, where the disturbance observer includes a unit delay and a controlled plant model that is under constant thermal load with A, B, and C matrices.

15. The method of claim 10, where temperature reference generator outputs a requested temperature of a heat generating device.

* * * * *